United States Patent [19]
Baumann

[11] Patent Number: 5,437,141
[45] Date of Patent: Aug. 1, 1995

[54] BROAD TAPE BINDING OF STACKED PACKED PRODUCTS

[75] Inventor: Kurt Baumann, Villmergen, Switzerland

[73] Assignee: ATS Automatic Taping Systems Ltd., Zug, Switzerland

[21] Appl. No.: 2,339

[22] Filed: Jan. 8, 1993

[30] Foreign Application Priority Data

Jan. 9, 1992 [CH] Switzerland .............. 00040/92

[51] Int. Cl.⁶ .............................. B65B 13/04
[52] U.S. Cl. ............................ 53/399; 53/589; 53/DIG. 2
[58] Field of Search .............. 53/399, 589, DIG. 2; 100/33 PB; 156/73.4

[56] References Cited

U.S. PATENT DOCUMENTS

| | | |
|---|---|---|
| 3,200,028 | 8/1965 | Chisholm .............. 100/33 PB |
| 3,445,307 | 5/1969 | Balamuth et al. ........ 100/33 PB |
| 3,661,667 | 5/1972 | Gardner et al. ........... 156/73.4 |
| 3,956,046 | 5/1976 | Tsuchiya et al. ........ 53/DIG. 2 X |
| 4,145,236 | 3/1979 | Neumayer et al. ....... 53/DIG. 2 X |
| 4,244,773 | 1/1981 | Stebeck et al. . |
| 4,265,687 | 5/1981 | Mercer et al. ............ 53/589 X |
| 4,483,438 | 11/1984 | Kobiella ............ 100/33 PB X |
| 4,767,492 | 8/1988 | Fukusima et al. ........ 53/DIG. 2 X |
| 5,110,040 | 5/1992 | Kalberer et al. .......... 53/DIG. 2 X |

FOREIGN PATENT DOCUMENTS 0269476 6/1988 European Pat. Off. .
0242480 10/1987 Japan .
1380430 1/1975 United Kingdom .

*Primary Examiner*—Linda B. Johnson
*Attorney, Agent, or Firm*—Bachman & LaPointe

[57] ABSTRACT

The method is performed on a tape banding machine with a winding tape made of a paper tape coated with plastic or lacquer which forms at least one tensionable loop. The loop is severed after tightening and binding the winding tape. When forming the loop, the tape banding machine directs the plastic or lacquer layer of a winding tape which is coated on one side onto its uncoated surface made of porous paper. Where the winding tape is coated on both sides, the plastic layers are directed onto each other. The free end is bound to the aforementioned winding tape by ultrasonic cold welding. The flat working surface of the sonotrode of a tape banding machine is divided into sections by at least one recess; it consists of preferably small grid surfaces. The recesses are preferably grooves which run in a lengthwise direction and at an angle of 30°-60° to this lengthwise direction.

16 Claims, 4 Drawing Sheets

BROAD TAPE BINDING OF STACKED PACKED PRODUCTS

FIELD OF THE INVENTION

The invention relates to a method for broad tape binding of stacked packed products on a tape banding machine with at least one winding tape made of a paper tape coated on at least one side which forms a tensionable loop, which is severed after tightening and binding the winding tape. The invention also relates to a sonotrode of a tape bending machine for broad tape binding of stacked packed products with at least one tensionable winding tape made of plastic or of a paper tape coated with a plastic or lacquer on at least one side.

BACKGROUND TO THE INVENTION

A tape banding machine binds square, rectangular, round or trapezoidal stacks by passing at least one tape around them; in the event that several tapes are used, these are passed around the stacks either simultaneously or consecutively. The packed products may be either hard or very soft. Thus for example printed products, trimmings, quilts, labels, banknotes, cheques, visiting cards, books, brochures, newspapers, pamphlets, signs, and also pharmaceutical products, textiles, socks, vegetable products, packs of cheese, meat packs, shoe soles or the like may be bound in stacks.

A tape banding machine operates semi-automatically or fully automatically. A winding tape made of paper, coated paper or plastic forms a loop into which the stack to be bound, the packed product, is introduced. The winding tape whose free end is clamped is pulled back, either controlled by a sensor or triggered by a manual or foot switch, until it lies adjacent to the packed product. Soft stacks may be more or less pressed together manually. The clamped end is then glued or welded to the tightened tape and cut off.

DISCLOSURE OF THE PRIOR ART

In information bulletin No. 1 of Jun 1991, the company Tanner & Co., CH-5615 Fahrwangen presented a tape banding machine which binds plastic films using ultrasonic cold welding. This method enables a clean closure, does not cause any burning loss of the film, leaves no deposit on the welding system, has no warm-up time, protects the edges, requires considerably less material outlay, produces less waste and permits cost savings.

This ultrasonic welding also enables heavy stackable products to be encompassed without problems, as tightly as desired and still without damage to the edges. The quick ultrasonic cold welding reduces waiting times and permits high productivity levels. The tape banding machine is offered in two design options, and as described in the information bulletin:

The loop version with an open hoop is particularly suitable for small products which have to be removed from the top.

The design with a hoop is particularly suitable for high performance operations and/or full automation. A tape banding machine according to EP, A1 0456604 may also be used for ultrasonic cold welding.

STATEMENT OF THE INVENTION

The inventors have sought to solve the problem of creating a method and a device of the type mentioned at the outset, which permits more rational and diverse broad tape binding with a simple and secure operating method.

As far as the method is concerned, the problem is solved according to the invention in that when forming the loop, the tape banding machine directs the plastic or lacquer layer of a winding tape which is coated on one side onto its uncoated surface made of porous paper or the layers of a winding tape of paper coated on both sides onto each other and binds the free end to the winding tape by ultrasonic cold welding. Special and further designs of the invention are the subject of dependent patent claims.

The method according to the invention allows the use of winding tapes of any width made of preferably porous paper, which are coated on at least one side with a plastic or lacquer. For the sake of simplicity, only plastic coatings are referred to below, where this term always also includes organic and inorganic lacquer coatings.

The loop may be produced using all kinds of tape banding machines, e.g. the loop version or the design with a hoop. Although both the use of coated paper and also ultrasonic cold welding of pure plastic films are in themselves known, the solution according to the invention has not previously been considered, in particular because direct welding of a plastic layer with paper did not appear possible. Numerous previous attempts by the inventor have for example failed.

In preference, the paper used for the winding tape is not only porous but also has a roughened free surface which forms the base for the end.

In particular for the use of a paper coated on one side, it is essential to use a porous absorbent paper whose surface allows a perfect and secure connection with the plastic coating on one side of the free end of the winding tape by means of ultrasonic cold welding.

The ultrasonic oscillations are usefully electrically generated, preferably within a frequency range of 30–50 kHz, in particular in the region of 40 kHz.

For the generation of oscillations, all known sonotrodes are suitable. The surface of the sonotrode is preferably constructed as described below, but it can also have a flat surface or any other known structure.

The plastic layers are generally speaking 10–20 $\mu$m thick. Hot melts, which are known to the expert and available on the market, together with thermoplastics such as polyethylene and polypropylene, are preferably used as coating materials. These represent an optimum solution from a technical, financial and ecological point of view.

The plastic is applied in a familiar manner to the paper tape, for example by spraying, extruding or rolling on, or else glued on as a film. The plastic may also be applied as a dispersion.

A tear-off closure may be arranged in a familiar manner in the area of the ultrasonic cold welding, e.g. by corresponding location of the weld position, whereby the free end of the winding tape remains free to be grasped and torn off.

With respect to the device, the problem is solved by the invention in that the flat working surface of the sonotrode is divided into sections by at least one recess. Special and more advanced design forms are the subject of dependent patent claims.

After the formation of recesses, a maximum of 80%, in particular 20–50%, of the flat working surface suitably remain.

The flat working surface of the sonotrode is preferably divided into sections by numerous recesses. The remaining parts of the working surface are also referred to as grid surfaces below.

The recesses between the grid surfaces preferably narrow in the direction indicated by the working surface and form a communicating channel system.

In test series, recesses which are designed as grooves running in two directions, preferably in the lengthwise direction of the working surface and at an angle of 30°–60° to the lengthwise edge of the working surface, have given particularly good results—in particular if the diagonal side surfaces of the grooves intersect at an angle of 30°–90°.

The optimum depth for the lengthwise and diagonal grooves has proven to be 0.5–1 mm, whereby the grooves are usefully between 1 and 3 mm apart.

The design of the working surface of the sonotrode according to the invention has brought about a remarkable improvement over conventional ultrasonic cold welding of winding tapes made of plastic. Using the method according to the invention with a plastic-coated paper winding tape, the design of the working surface of the sonotrode plays a decisive part. The quality of the connection may be directly dependent on the design of the working surface of the sonotrode.

The use of a sonotrode according to the invention leads to particularly advantageous results, in conjunction with the method according to the invention with all types of tape banding machines, both the loop version and also the design with a hoop. All the advantages of ultrasonic welding achieved with plastic films are achieved in all common tape widths, including with paper winding tapes coated on one side with plastic, with a machine without any warm-up time, which leads to a clean closure without deposits on the welding system, and permits marked cost savings in conjunction with less material outlay, producing less waste regardless of the type of tape banding machine concerned.

BRIEF DESCRIPTION OF THE DRAWINGS

The invention is described in greater detail using design examples shown in the drawings, which are also the subject matter of dependent patent claims.

The drawings show the following.

DETAILED DESCRIPTION OF THE PREFERRED EMBODIMENTS

Figure 1:
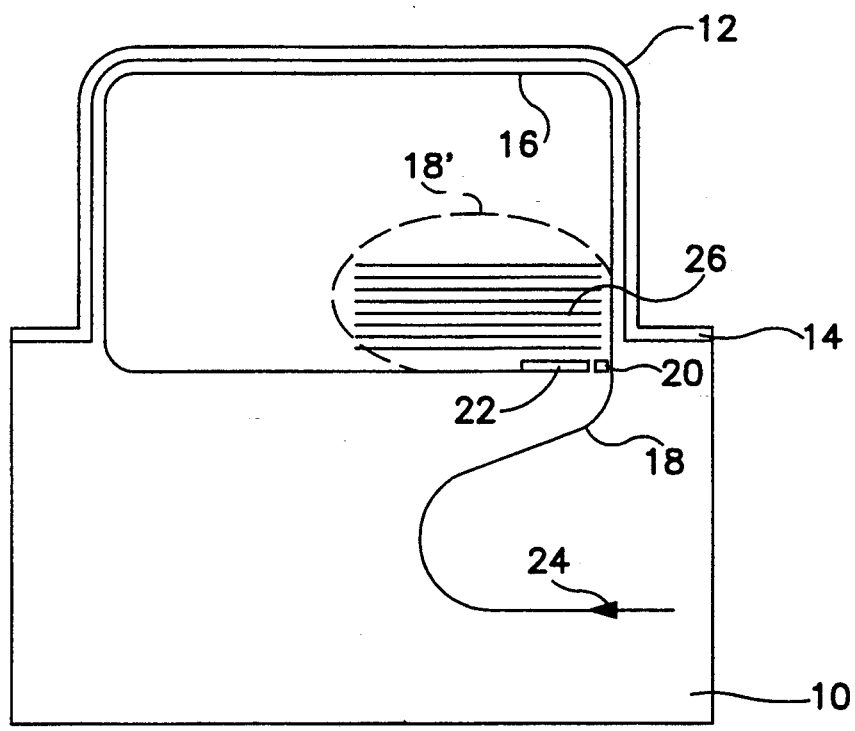
FIG. 1 an exploded diagram of the principles of a tape banding machine with a flanged tape guide, FIG. 2a a section through a superposed winding tape coated on one side, at the location of the subsequent ultrasonic cold welding, FIG. 2b a section corresponding to FIG. 2a through a winding tape coated on both sides, FIG. 3 a view of a sonotrode carriage with cutting unit of a tape banding machine, FIG. 4 a plan view of the working surface of a sonotrode, FIG. 5 a partial detailed view of a sonotrode in the working surface area, FIG. 6 a side view of a sonotrode in the working surface area, and FIG. 7–9 a variant corresponding to FIG. 4–6.

On a tape banding machine 10 shown in FIG. 1, described in brief as a banding machine, a tape guide 12 with internal sliding surface 16 is provided by means of flanges 14. First of all a small loop of winding tape 18 is formed, which is pushed up into a large loop using an advance mechanism not shown here. The dashed line 18' shows the increasing loop in an intermediate stage, whereby the packaged product shown has of course not yet been inserted. The winding tape 18, which is shown pulled out, indicates the final stage of the loop formation, and at this stage the packaged product is inserted.

Of the devices which are arranged in the tape banding machine 10, which are in themselves known, such as draw-in rollers, reciprocal tensioning rollers, tape width adjustment, tape clamps, pressure pads and blades, only a welding plate 22 for binding the advanced free end of the winding tape with the drawn back winding tape 18 itself is shown, for the sake of simplicity and case of viewing. The advance is determined by the clamping time of the winding tape 18 between the pull-in rollers which turn at constant speed. The withdrawal is triggered after a sensor 20 displays the insertion of packed product 26 and is effected by the clamping of winding tape 10 between the tensioning rollers in the opposite direction to arrow 24. After the withdrawal with adjustable tensile force, the winding tape 18 completely surrounds the stack inserted, packed product 26. Of course there may be manual control in place of the sensor control.

Figure 2A:
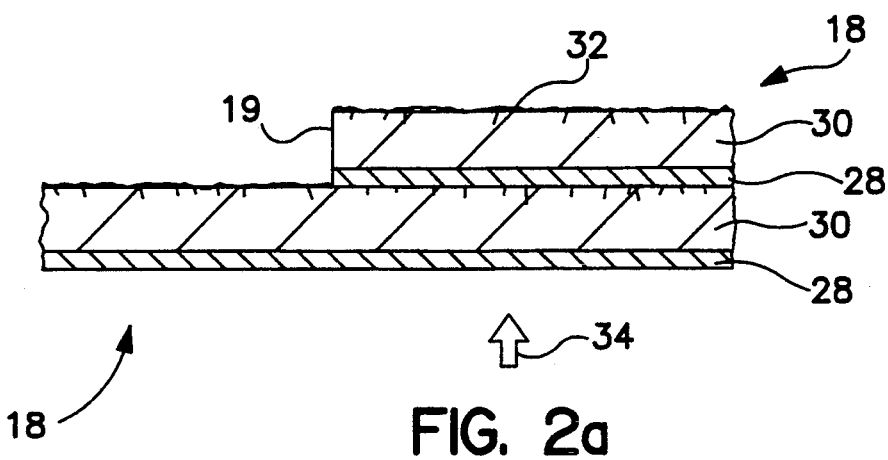

FIG. 2a shows the pushed up winding tape 18 coated on one side with the free end 19, which is laid on the winding tape 18 which forms the beginning of the loop. The winding tape 18 consists of a paper tape 30 coated with a plastic or a lacquer 28, in this case with a hot melt. The free surface 32 of the paper 30 is designed to be porous and rough. The sonotrode (FIG. 3) acts on the winding tape 18 in the direction of arrow 34.

Figure 2B:
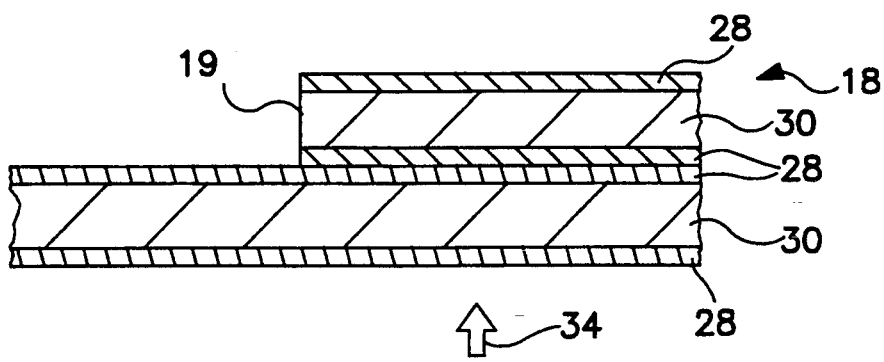

FIG. 2b shows a pushed up winding tape 18 coated on both sides. At the free end 19, two coatings 28 of plastic or lacquer are superposed. The sonotrode 38 also acts in the direction of the arrow 34.

Figure 3:
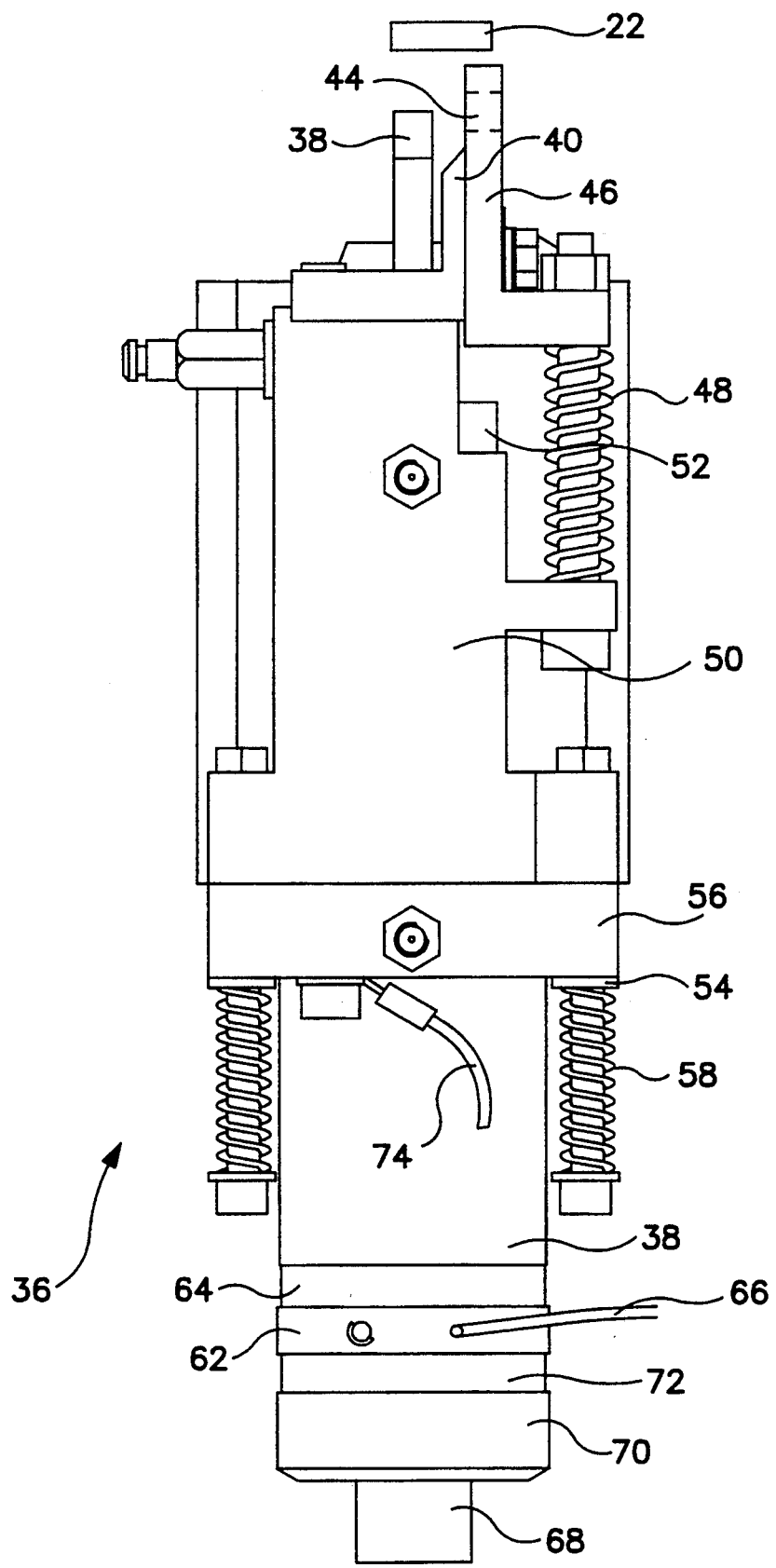

A sonotrode carriage shown in FIG. 3 with cutting unit 36 is the mounting and drive both for a sonotrode 38 and for a blade 40.

The ultrasonic waves produced by the sonotrode 38 are reflected by a counterpressure slide, as the welding plate 22 is designated in this case.

The winding tape 18 (FIG. 1) is taken through a opening shown as a dashed line in a blade clamp angle bracket 46. Two pressure springs 48 which are arranged behind one another in the direction of view are tensioned when the blade clamp angle bracket 46 is moved.

A sonotrode mounting 50 takes an upper and lower sonotrode guide 52, 54. Two guided pressure springs 58 which are diagonally opposite one other act on a sonotrode clamping ring 56.

An insulating ceramic ring 64 is arranged between the cylindrical part of sonotrode 38 and its electrode 62. A sonotrode connection cable 66 to the positive pole is connected to electrode 62.

A sonotrode connection cable 74 leading to the negative pole is connected to the sonotrode clamping ring 56.

A sonotrode ring 70 is processed against a further ceramic disk 72, which is also adjacent to electrode 62, with a cylindrical screw 68.

Figure 4:
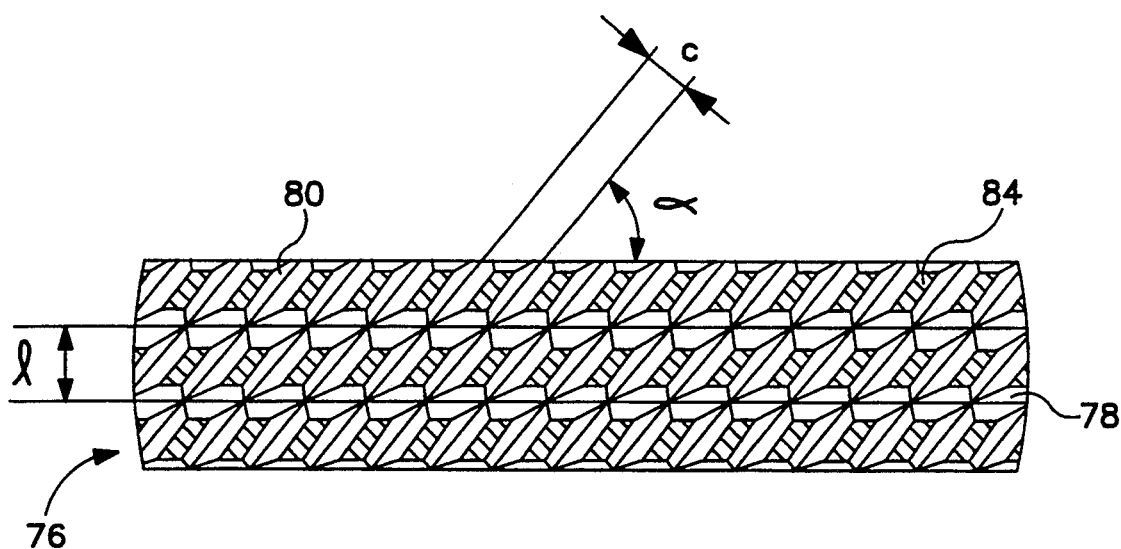

A flat working surface 76 of a sonotrode 38 which is shown in FIG. 4 comprises two lengthwise grooves 78 and a number of diagonal grooves 80. The lengthwise and diagonal grooves form an angle $\alpha$ of about 30° to 60° C., preferably approximately 50° C. The lengthwise grooves 78 are at a distance 1 to 2 mm apart, the diagonal grooves 80 are spaced at a distance c of approximately 1.25 mm.

Figure 5:
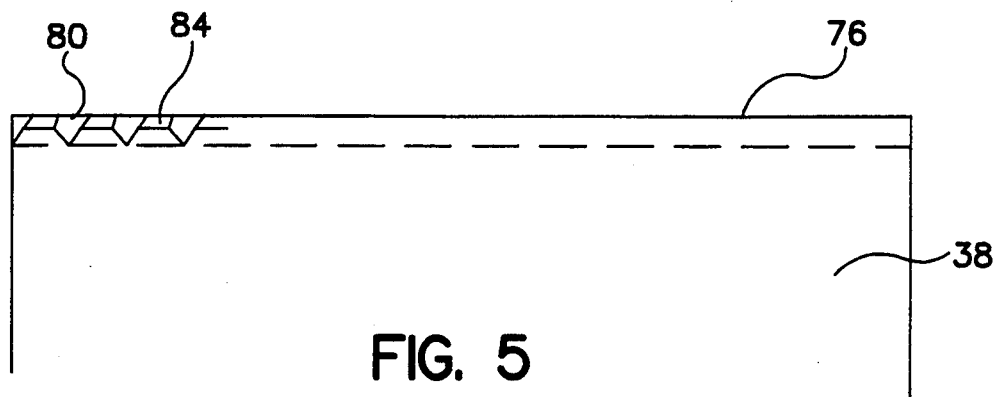
Figure 6:
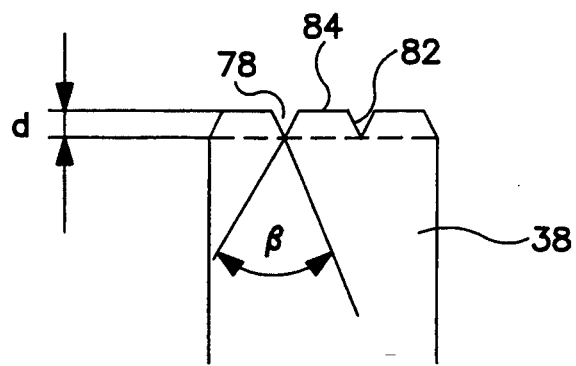

Lengthwise and diagonal grooves 78, 80, as may be seen more clearly in FIGS. 5 and 6, have essentially a triangular cross section, with the narrowing side faces 82 forming an angle $\beta$ of about 30° to 90° C., preferably 60°. The depth of the groove d is 0.75 mm.

Because of the formation of lengthwise and diagonal grooves 78, 80, a number of grid surfaces 84 which are highlighted by shading and whose shape is that of a parallelogram remain from the working surface 76 of sonotrode 38.

The working surface 76 shown in FIG. 4 is in use around 25×5 mm in size, so that numerous small grid surfaces 84 are formed. This is of fundamental importance for the success of the device according to the invention.

Sonotrodes 38 corresponding to FIGS. 4–6 are particularly suitable as "combi-sonotrodes". Without changing the sonotrode 38, winding tapes 18 of plastic, foam plastic or paper coated with hot melt or foil, can be welded together.

Figure 7:
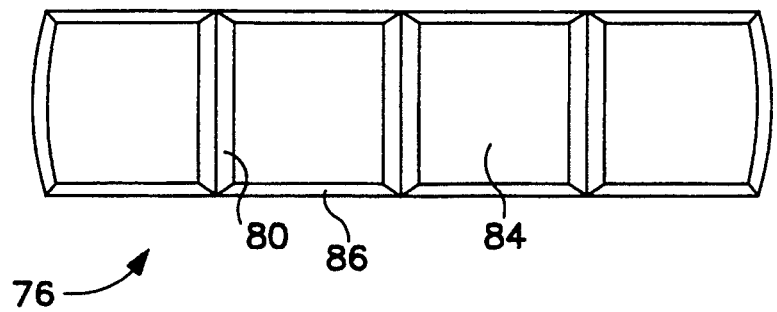
Figure 8:
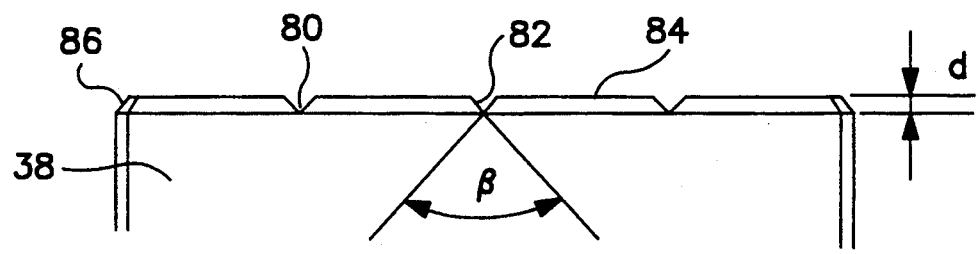
Figure 9:
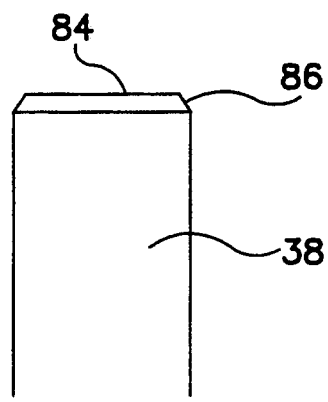

A variant of a sonotrode 38 is shown in FIGS. 7–9. FIG. 7 shows that the working surface 76 is divided into four approximately square part areas, known as grid surfaces 84, by three lateral grooves 80. The lateral grooves 80 are designed with a triangular cross-section, with an angle $\beta$ of approximately 90° (FIG. 8). The groove shape and groove depth d correspond approximately to those of FIG. 6.

The working surface has peripheral chambers 86.

The sonotrode 38 corresponding to FIGS. 7–9 requires a stronger generator than the preferred design form corresponding to FIGS. 4–6. By increasing the number of lateral grooves 80 and/or the formation of longitudinal grooves 78 (FIG. 4), the grid surfaces 84 become ever smaller, in the extreme case almost forming lines or points.

The number of recesses, either lateral grooves 80 and/or longitudinal grooves, can on the other hand be reduced to one with a corresponding increase in generator power. Working surface 76 without recess can also perform the process according to the invention.

I claim:

1. A method for broad tape binding of stacked, packed products comprising:
   providing a composite laminate tape having a first substrate layer of porous paper and a second laminate layer of a material selected from the group consisting of plastic and lacquer, said second laminate layer having a thickness of about 10–20 $\mu$m;
   providing stacked, packed products;
   forming a loop from said composite laminate tape around said stacked, packed products; and
   bonding a free end of said composite laminate tape to a surface of said composite laminate tape by ultrasonic cold welding so as to form a closed loop.

2. A method according to claim 1 including bonding the second laminate layer of said free end to the first substrate layer surface of said composite laminate tape by ultrasonic cold welding.

3. A method according to claim 2 including bonding the first substrate layer of said free end to the first substrate layer surface of said composite laminate tape by ultrasonic cold welding.

4. A method according to claim 1 including ultrasonic cold welding at a frequency of about 30 to 50 kHz.

5. A method according to claim 1 including ultrasonic cold welding at a frequency of about 40 kHz.

6. A method according to claim 2 including roughing said first substrate layer surface.

7. A method according to claim 1 wherein the plastic material is selected from the group consisting of hot melts and thermal plastic.

8. A method according to claim 1 wherein the plastic material is selected from the group consisting of polethylene and polypropylene.

9. A method according to claim 8 including applying said second laminate layer by spraying.

10. A tape banding machine comprising:
    loop forming means for forming a loop from a composite laminate tape having a first substrate layer of paper and a second laminate layer of a material selected from the group consisting of plastic and lacquer;
    a welding plate; and
    sonotrode means for producing ultrasonic waves spaced from said welding plate for bonding a free end of said composite laminate tape to a surface of said composite laminate tape by ultrasonic cold welding so as to form a closed loop, said sonotrode means having a flat working surface facing toward said welding plate, said flat working surface having at least one recess means for dividing said working surface into a plurality of sections wherein a plurality of diagonal and longitudinal recesses intersect on said working surface for dividing said working surface into a plurality of grid surfaces and wherein the diagonal recesses form an angle $\alpha$ with an edge of the working surface of the sonotrode means and with the longitudinal recesses, said angle $\alpha$ being between about 30° to 60°.

11. A machine according to claim 10 wherein said plurality of recesses are substantially V-shaped.

12. A machine according to claim 10 wherein the V-shaped diagonal recesses form an angle $\beta$ of between about 30° to 90°.

13. A machine according to claim 10 wherein the diagonal recesses are spaced apart a distance of between about 1 to 3 mm and are about between 0.5 to 1 mm deep.

14. A machine according to claim 10 wherein the angle $\alpha$ is about 50°.

15. A machine according to claim 12 wherein the angle $\beta$ is about 60°.

16. A machine according to claim 12 wherein the longitudinal recesses are about 2 mm apart and the diagonal recesses are about 1.25 mm apart.

* * * * *